United States Patent [19]
De Cock

[11] 3,743,838
[45] July 3, 1973

[54] DEVICE FOR DETECTING IRREGULARITIES IN A MOVING MATERIAL

[75] Inventor: Etienne Marie De Cock, Hamme, Belgium

[73] Assignee: AGFA-Gevaert, N.V., Mortsel, Belgium

[22] Filed: June 7, 1971

[21] Appl. No.: 150,653

[30] Foreign Application Priority Data
June 8, 1970 Great Britain.................. 27,618/70

[52] U.S. Cl..................... 250/219 DF, 250/219 WE
[51] Int. Cl. ........................................... H01j 39/12
[58] Field of Search ................. 250/219 F, 219 DF, 250/219 NE, 223; 356/237, 202, 203, 204, 205, 206; 209/111.7

[56] References Cited
UNITED STATES PATENTS

| 3,560,096 | 2/1971 | Watson.......................... | 250/219 DF |
|---|---|---|---|
| 3,286,567 | 11/1966 | Wright........................... | 250/219 DF |
| 3,409,779 | 11/1958 | Fertig .......................... | 250/219 WE |
| 3,105,151 | 9/1963 | Nash............................. | 250/219 DF |
| 3,515,883 | 6/1970 | Akamatsu...................... | 250/219 DF |
| 3,158,748 | 11/1964 | Laycak ......................... | 250/219 DF |
| 2,866,376 | 12/1958 | Cook............................. | 250/219 DF |

Primary Examiner—James W. Lawrence
Assistant Examiner—D. C. Nelms
Attorney—William J. Daniel

[57] ABSTRACT

A device for detecting irregularities in a moving sheet material by detection of light by means of photodetectors after reflection from or passage through the sheet. The output signals of each photodetector are filtered, amplified, clipped and discriminated in a discriminating detector to separate the smaller from the greater irregularities.

An AND-gate to which the unclipped signals of a series of photo-detectors are fed, permits the retrieval of irregularities extending over the width of the sheet.

OR-gates to which the unfiltered signals of a series of photo-detectors are fed, permit the retrieval of serious defects in the sheet material.

8 Claims, 4 Drawing Figures

Patented July 3, 1973 3,743,838

Patented July 3, 1973    3,743,838

DEVICE FOR DETECTING IRREGULARITIES IN A MOVING MATERIAL

This invention relates to a device for detecting irregularities in a moving sheet material of the type comprising a source for directing electromagnetic energy on one surface of the material, a series of photoelectric detectors for detecting modifications in the energy after reflection from or passage through the said sheet material.

Such a device is known from the U.S. Pat. No. 3,454,160. With a device according to this patent specification it is not possible to make a distinction as to the type, the size and the length of the faults.

It is the object of the present invention to provide a device and method of testing which enables the distinction between the various types of faults, whereby the origin of the fault can be traced and eliminated.

According to the invention means are provided which make a distinction between pulses lasting shorter than a standard period and those pulses which last longer than this standard period.

According to a further embodiment of the invention means are provided for detecting faults which are directed almost normal to the travelling direction of the material.

The photoelectric detectors are preferably arranged in a stationary way and are intended for measuring the radiation which is transmitted by the material or which is reflected thereby.

In the following description, the expression "sheet material" includes strip or sheets of material such as, e.g., photographic films, strips of synthetic material, paper webs and paper sheets.

The invention consists of a device for detecting irregularities in a moving sheet material, comprising a source for directing electromagnetic energy to a surface of the sheet material, a series of photoelectric detectors for detecting the radiation after reflection from or passage through the said surface, means for individually amplifying, filtering, and clipping the output signals of the photoelectric detectors, a summing amplifier adapted to be fed by the individually amplified, filtered and clipped outputs of the photoelectric detectors, and means for shaping the output signal of the summing amplifier, and discriminating detection means for detecting and discriminating pulses lasting shorter than a predetermined time period from those which last longer than the said predetermined time period.

An embodiment of the invention is hereinafter described and illustrated in the accompanying drawings in which.

In the measurement of irregularities in a moving sheet material different kinds of disturbing influences must be considered, such as the vibration in a direction normal to the travelling direction of the material, the cloudiness of the material, i.e., irregularities in the composition of said material, electrical disturbances, etc.

A device for preventing the vibration of the moving sheet in the direction normal to its travelling direction is described in our copending United Kingdom Pat. application No. 27,617/70. By means of this device it is possible to maintain to a strictly constant value the mutual distances of the radiant energy source, the sheet and the detectors.

The limiting of the influence of the cloudiness can be obtained by controlling the output signals of the detectors through an electric filter, because at a determined speed of the strip the cloudiness may give rise to a signal showing a frequency spectrum which can be determined for each material by way of tests.

The electric disturbances can be limited by providing a suitable shielding of the complete measuring instrument.

For the purpose of increasing the signal-noise ratio for small faults the number of photoelectric detectors per cm of sheet width can be increased. In a preferred embodiment e.g. 24 photoelectric detectors are used per measuring group having a total width of 4 cm. As photoelectric detectors silicon phototransistors may be applied such as the MRD 200 type marketed by Motorola, Phoenix, Ariz., U.S.A.

Figure 1:
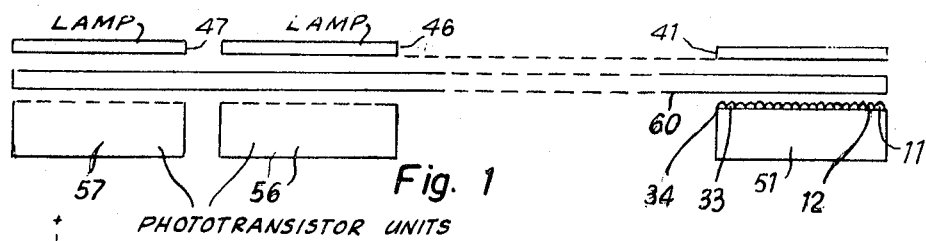
FIG. 1 is a diagrammatic view, according to the transverse direction of the sheet, of the radiant energy sources and the detectors.

In the arrangement according to FIG. 1 the sheet 60 to be examined is moving in a direction normal to the plane of the drawing at a speed in the order of magnitude of 0.5 to 1 m/s. The phototransistors are divided into seven groups of 24 phototransistors each, wherein each group of transistors is arranged on one of the measuring units 51 to 57 and the measuring units are positioned in spaced relationship over the width of the film sheet 60. So the transistors 11 to 34 of the first group are positioned inline on the measuring unit 51. The transistors 11 to 34 are located at a distance of e.g., 6 mm from the film sheet 60.

Opposite to the measuring units 51 to 57 seven elongate lamps 41 to 47 are positioned, each provided with a cylindrical lens and which each project a line of light on the film sheet 60. The intensity of the line of light can be controlled by adjusting the feed voltage of the lamps 41 to 47 and preferably in such a way that the phototransistors operate in a favorable range of their operating range. In the examination of, e.g., light-sensitive materials infrared light can be used in arranging an appropriate optical filter between the lamps and their lenses so that the light-sensitive material is not fogged.

Figure 2:
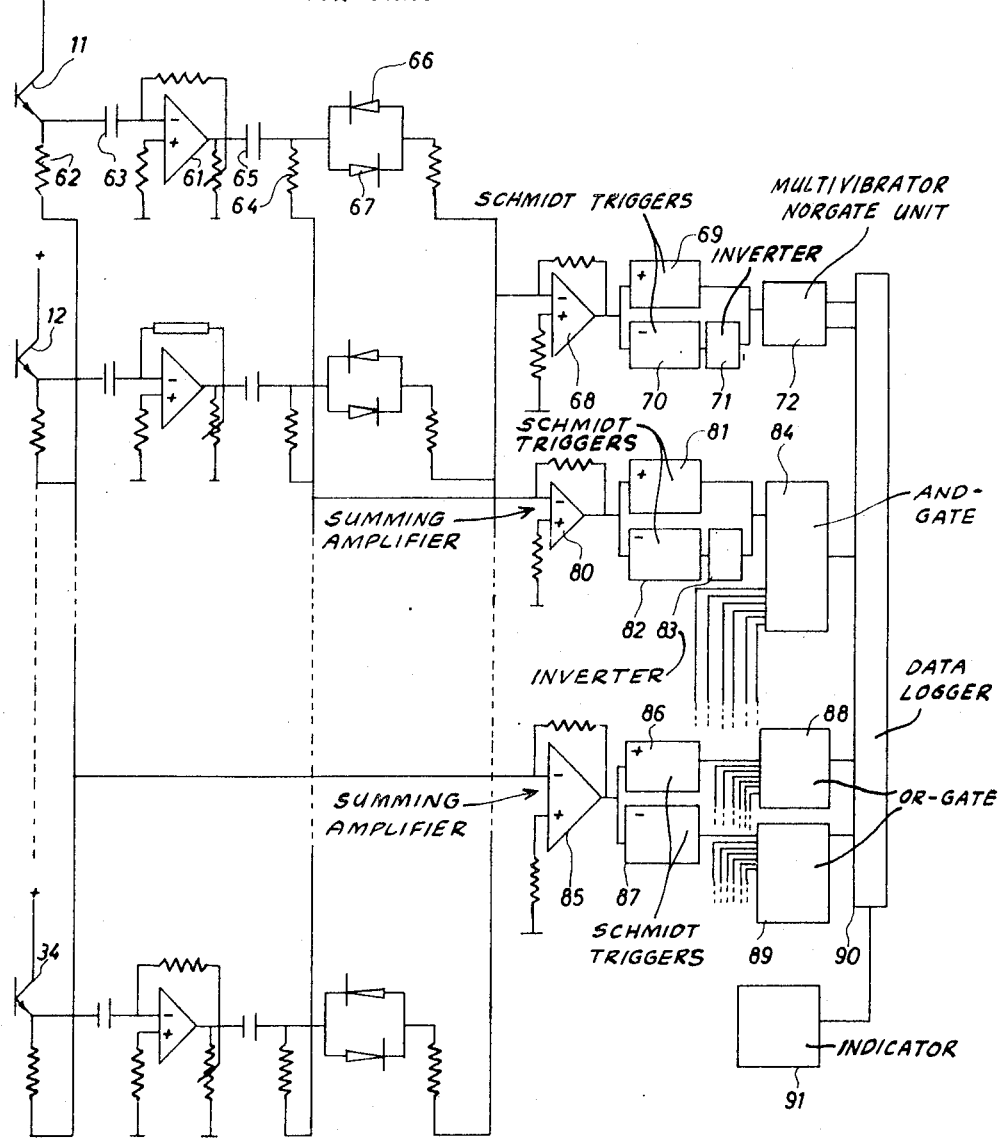
FIG. 2 is an electronic circuit, partly represented as a block-diagram of an embodiment according to the invention.
Figure 4:
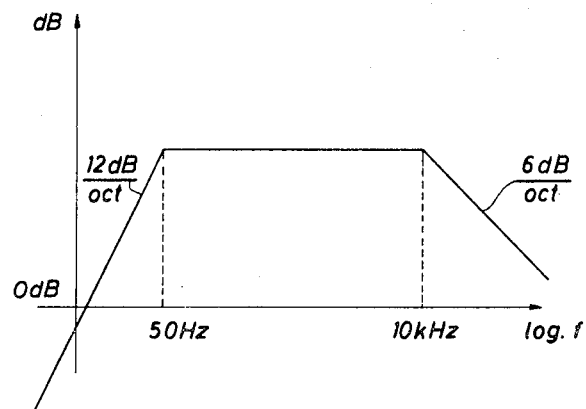
FIG. 4 is the approaching frequency response curve of the individual amplifiers and filters of the photoelectric detectors.

FIG. 2 is an electric circuit of an embodiment of the invention. The output signals of the phototransistors 11 to 34 of unit 51 are individually amplified in, e.g., an operational amplifier such as 61, filtered, e.g., by means of a high-pass filter constituted by two RC circuits 62–63 and 64–65 which have their 3 dB point at 50 Hz and decrease under 50 Hz by 12 dB/oct. The operational amplifier 61 is fed back in such a way that the amplification above 10 kHz decreases by 6 dB/oct. In this way a frequency response curve is obtained as represented in FIG. 4 for the series connection of the operational amplifier 61, and the two RC circuits. So the low frequencies which are principally caused by the cloudiness of the material, which phenomenon is not disturbing per se for the various applications of the material, are not transmitted whereas the high frequencies are equally cut off although not so sharply, since these high frequencies correspond to very small faults in the material which are less important to the material to be evaluated. In limiting the frequency band in this way the signal-noise ratio is improved as well. To further improve the signal-noise ratio the signal amplified in the operational amplifier 61 is clipped, e.g., by means of two anti-parallel connected silicon diodes 66 and 67.

The operation of the circuit described so far is as follows. The output signal of the phototransistor 11 is amplified in such a way that the noise amounts to about 400 mV. Thereafter the signal is clipped by the diodes 66 and 67 so that only signals greater than, e.g., 400 mV are transmitted by the diodes.

The signals of the phototransistors 11 to 34 which are each individually amplified, filtered and clipped are summed in a summing amplifier 68 the output of which is connected to the input of two parallel-connected Schmitt-triggers 69 and 70, for the positively and negatively directed signals, respectively. The output signal of the Schmitt-trigger 70 is inverted in an invertor 71 and is connected together with the output signal of the Schmitt-trigger 69 to the input of an instrument 72 which will be described further with reference to FIG. 3.

Figure 3:
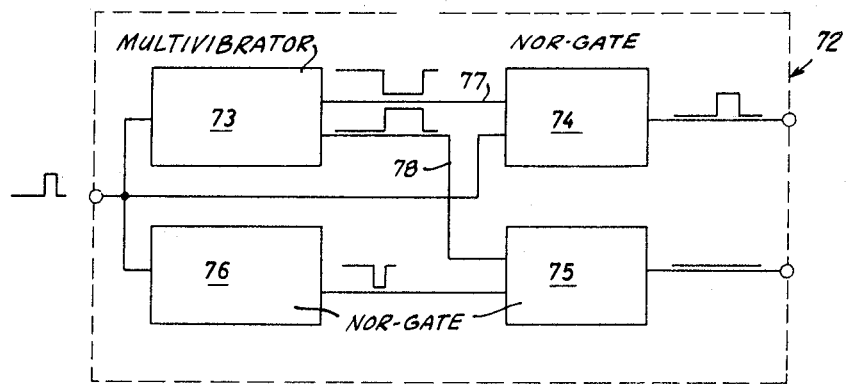
FIG. 3 is a block-diagram of part of the circuit according to FIG. 2.

The circuit of FIG. 3 permits to separate irregularities the time duration of which is smaller than a determined adjustable standard period from irregularities the time duration of which is longer than the standard period. The unit 73 is a one-shot multivibrator which in response to, e.g., a positive pulse applied from the units 69 and 71 to its input, supplies two logical complementary output pulses of a determined period at its outputs 77 and 78, e.g., a negatively going pulse at the output 77 and a positive pulse at the output 78. Together with the input signal of the unit 72 the signal of output 77 feeds the two inputs of a NOR-gate 74 whereby the gate 74 only delivers an output pulse when the input signal of the unit 72 is of shorter duration than the pulse period of the multivibrator 73. On the other hand the output 78 of the multivibrator 73 is connected with an input of a second NOR-gate 75 whereas the other input of the gate 75 is connected over a third NOR-gate 76 with the input of the unit 72 so that the NOR-gate 75 delivers only an output signal when the input signal of the unit 72 lasts longer than the pulse period of the multivibrator 73. In this way the faults can be accurately separated in small and long faults. Since the separation in short and long irregularities is dependent on the speed of the material the standard period of the one-shot multivibrator is preferably inversely proportional to the travelling speed of the sheet.

Returning to the circuit diagram according to FIG. 2 the terminal of the resistor 64 which is not connected to the capacitor 65, is connected to the corresponding terminals of the corresponding resistors of the electric circuits of the transistors 12 to 34, and connected also to the input of a summing amplifier 80. The output of the amplifier 80 is connected with two Schmitt-triggers 81 and 82 for positive and negative signals respectively, the output of the trigger 82 being connected through an invertor 83 to the output of the trigger 81 and to an input of an AND-gate 84. The AND-gate 84 has seven inputs which are connected to the corresponding nodes of the circuits pertaining to the measuring units 51 to 57.

The output signal of the AND-gate 84 provides an indication of irregularities extending according to the transverse direction of sheet. Amongst others these faults may be caused by vibration of the sheet during the manufacturing thereof.

The terminal of the resistor 62 which is not connected to the transistor 11 is connected to the corresponding node of the corresponding resistors of the other phototransistors and to the input of the summing amplifier 85. The output of the amplifier 85 is connected to two Schmitt-triggers 86 and 87 for positively and negatively going signals respectively. The triggers 86 and 87 are connected to an input of OR-gates 88 and 89. The OR-gates 88 and 89 have each seven inputs, the remaining inputs being each connected with the corresponding nodes of the circuits of the measuring units 51 to 57.

The output signal of the OR-gate 88 is representative for an intense light signal on at least part of the transistors of one of the units 51 to 57 and, in case of measuring a photographic film this signal points, e.g., thereto that no emulsion has been coated on at least part of the film. The output signal of the OR-gate 89 is representative for a weak light signal on part of the transistors caused, e.g., by very coarse impurities on the film.

The outputs of the elements 72, 84, 88 and 89 are connected to a data logger 90 which is connected itself to an executing instrument or indicator 91 such as an automatic typewriter with which, e.g., for each length of 30 m of the sheet, the number of detected short and long irregularities and the numbers of transversally directed irregularities are indicated for each measuring unit. Moreover, the instrument 91 may give an indication that in a determined part of a length of 30 m of the sheet a pulse is received from the element 88 or 89, which points to the presence of serious faults in this part of the sheet.

The present invention is not limited to the use of a data logger and a typewriter but includes all possible instruments enabling the use of the various output signals of the circuit according to FIG. 2 for measurement or control purposes.

We claim:

1. A device for detecting irregularities in a moving sheet material, comprising a source for directing electromagnetic energy to a surface of the sheet material, a series of photoelectric detectors for detecting the radiation after reflection from or passage through said surface, means for individually amplifying, filtering, and then clipping the outputs of the photoelectric detectors, a summing amplifier adapted to be fed by the individually amplified, filtered and clipped outputs of the photoelectric detectors, and means for shaping the output signal of the summing amplifier, and discriminating detection means for detecting and discriminating pulses lasting shorter than a predetermined time period from those which last longer than said predetermined time period, said discriminating detection means comprising a one-shot multivibrator capable of producing two logical complementary output pulses at its output terminals, and two NOR-gates which are so connected with the input and output terminals of said multivibrator that a first NOR-gate only produces an output pulse if the input signal of the detection means is of shorter duration than the predetermined pulse period of the multivibrator, and that a second NOR-gate only produces an output pulse if the input signal of the detection means is of longer duration than the predetermined pulse period of the multivibrator.

2. Device according to claim 1, wherein the said predetermined pulse period is adjusted to be directly proportional to the travelling speed of the sheet material.

3. Device according to claim 1, wherein the photoelectric detectors are divided into a number of groups, wherein each group comprises a summing amplifier which is fed by the individually amplified and filtered signals of the photoelectric detectors of said group.

4. A device according to claim 1, comprising an AND-gate which receives at its inputs the signals from the photoelectric detectors before said signals have been clipped by the clipping means.

5. A device according to claim 4, comprising summing amplifiers for summing the signals of a series of photoelectric detectors, the outputs of said summing amplifiers being fed to said AND-gate.

6. A device according to claim 1, comprising OR-gates which receive at their inputs the signals from the photoelectric detectors before said signals have been amplified and filtered.

7. A device according to claim 6, comprising summing amplifiers for summing the signals of a series of photoelectric detectors, the outputs of said summing amplifiers being fed to said OR-gates.

8. Device according to claim 1, wherein the means for filtering the signals of the photoelectric detectors have an approaching frequency response curve which at a frequency which is a function of the cloudiness of the material and proportional to the moving speed of the material, decreases by 12 dB/oct, so that the signals produced by cloudiness of the sheet material are substantially filtered.

* * * * *